United States Patent [19]

Koltveit

[11] 4,277,992

[45] Jul. 14, 1981

[54] JOINTED TOOL

[76] Inventor: Arthur O. Koltveit, 1410 S. Sterling St., Streator, Ill. 61364

[21] Appl. No.: 52,450

[22] Filed: Jun. 26, 1979

[51] Int. Cl.³ .............................................. B25B 13/00
[52] U.S. Cl. ............................................... 81/177 UJ
[58] Field of Search ....................... 81/177 UJ; 403/57

[56] References Cited

U.S. PATENT DOCUMENTS

| 868,454 | 10/1907 | Korth | 81/177 UJ X |
|---|---|---|---|
| 1,300,148 | 4/1919 | Evans | 81/177 UJ X |
| 1,361,130 | 12/1920 | York | 81/177 UJ X |
| 1,875,376 | 9/1932 | Hammer et al. | 81/177 UJ X |
| 2,964,980 | 12/1960 | Riley et al. | 81/177 UJ X |

Primary Examiner—James G. Smith
Attorney, Agent, or Firm—David V. Munnis

[57] ABSTRACT

Jointed tool having an upper portion which is rotated manually or by non-manual power means, a lower portion which rotates and has a work-piece contacting tool element, e.g., nut-gripping socket, screw driver point, drill bit, and the like, and a pin-mounted gimbal joint connecting the upper and lower portions thereof, allowing thereby the lower portion tool element to operate upon work pieces at angles offset up to and over 40 degrees from their axes.

7 Claims, 9 Drawing Figures

U.S. Patent     Jul. 14, 1981     4,277,992
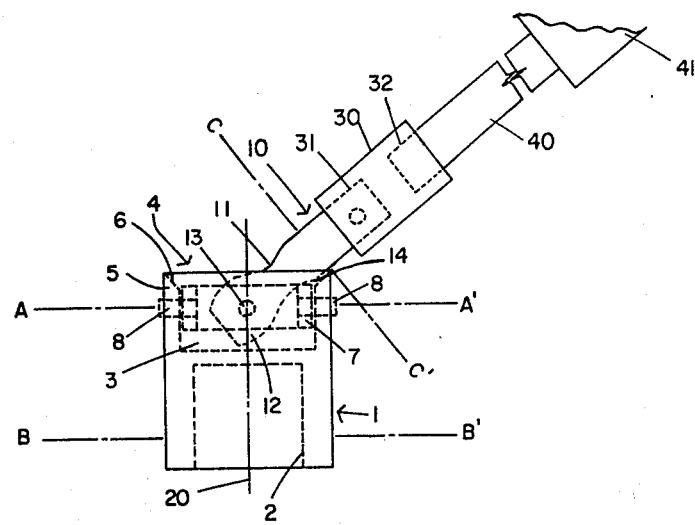
FIG. 1
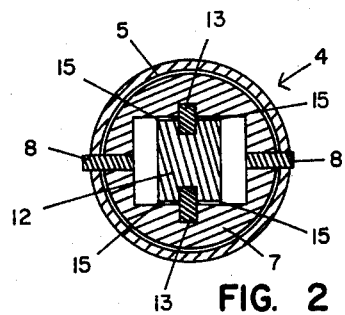
FIG. 2
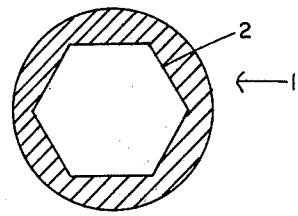
FIG. 3
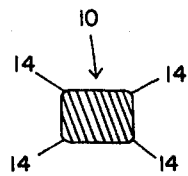
FIG. 4
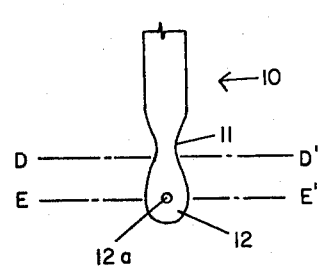
FIG. 5
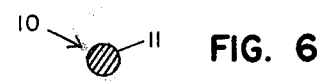
FIG. 6
FIG. 7
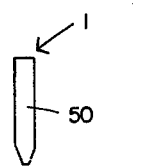
FIG. 8
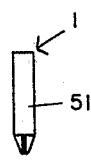
FIG. 9

JOINTED TOOL

BACKGROUND OF THE INVENTION

Tools which effect the desired working by rotating a work-piece tool element are widely used. Such tools include socket wrenches, screw drivers, drills, and the like. In many instances it is desired or necessary that the work piece be contacted in a location where space limitations and/or operating conditions render it difficult or even impossible for a conventional tool having a straight configuration to reach. For such latter cases, it has been suggested to employ a jointed tool having an intermediate connection between the upper driving portion and the lower work-piece contacting portion which is provided by a conventional interlocked "U-joint" universal joint. Such tools while suitable for some applications have not proved to be totally satisfactory in being limited, due to the nature of "U-joint" universal joints, to cases wherein the offset angle of the upper portion to the axes of the lower portion is less than about 26 degrees and wherein manual power only is to be applied to rotate the tool.

Accordingly, a search has continued in the art for a simple, versatile tool adapted to be utilized at offset angles greater than conventional jointed tools and further adapted to be efficiently employed with non-manual power equipment.

OBJECTS OF THE PRESENT INVENTION

Accordingly, it is the primary object of the present invention to provide an improved novel jointed hand tool.

Another object of the present invention is to provide an improved jointed hand tool which operates by rotation of a work-piece contacting tool element and which advantageously is adapted to efficiently function at offset angles greater than conventional jointed tools.

An additional object of the present invention is to provide a novel jointed hand tool which advantageously is adapted to operate at offset angles of up to and over 40 degrees and yet is adapted to be efficiently driven by non-manual power means.

Still a further object of the present invention is to provide a novel jointed hand tool which is adapted to be efficiently operated either manually or by non-manual power drive means at relatively large offset angles, and which yet is simple in construction, durable, and inexpensive to manufacture.

BRIEF DESCRIPTION OF THE DRAWINGS

The above and other objects are achieved and are features of the novel jointed hand tool of the present invention which will be described hereinbelow in detail with particular reference being made to the attached drawings of which:

FIG. 1 is a diagramatic sideview of a jointed hand tool of the present invention;

FIG. 2 is a sectional view of the embodiment of the jointed hand tool shown in FIG. 1, taken along line A—A';

FIG. 3 is a sectional view of the embodiment of the jointed hand tool shown in FIG. 1, taken along line B—B';

FIG. 4 is a sectional view of the embodiment of the jointed hand tool of the present invention shown in FIG. 1, taken along line C—C';

FIG. 5 is a diagramatic side view showing another embodiment of the gimbal-joint connecting end of the upper drive portion of the jointed hand tool of the present invention;

FIG. 6 is a sectional view of FIG. 5 taken along line D-D';

FIG. 7 is a sectional view of FIG. 5 taken along line E—E';

FIG. 8 is a diagramatic side view showing another embodiment of the work-piece contacting element of the jointed hand tool of the present invention, ie, a screw driving point;

FIG. 9 is a diagramatic side view showing yet another embodiment of the work-piece contacting tool element of the present tool, ie., a phillips screw driving point.

DESCRIPTION OF SPECIFIC EMBODIMENTS

With reference to FIG. 1, the jointed hand tool of the present invention comprises an upper power drive portion, designated generally numeral 10, a lower work-piece contacting portion, designated generally numeral 1, and a pin-mounted gimbal connection means, designated generally numeral 4, the latter joining upper portion 10 to lower portion 4 so as to transmit at a constant velocity the rotation of upper portion 10 to lower portion 4. This latter feature which is a characteristic of the gimbal joint adapts the tool of the present invention for use with non-manual driving sources, with their usual higher speeds and torques, where conventional "U-joint" universal joint-containing jointed tools are not practical due to the rotation lag characteristic thereof imparting large shear stresses in the connecting pins thereof.

In accordance with the present invention, upper power drive portion 10 suitably may consist of a single unitary rotatable element which serves as the handle means for manually rotating portion 10 or as the means connectable to a portable source of non-manual power driving means. In other embodiments, upper portion 10 includes a lower rod element 11, connected at its lower end 12 in gimbal joint 4, an optional upper rod element 40, serving as an extension element, and an intermediate rod connection means 30. At its upper end, upper tool portion 10 suitable may be provided with a power application means 41, which in manual driven embodiments is a gripping handle, and in non-manual driven embodiments is a portable, rotatable connection of a non-manual power source.

In accordance with the present invention, gimbal joint means 4 is provided by lower end 12 of upper portion 10 being pivotally connected, by pin means 13, in the interior of ring element 7, with ring element 7 being, in turn, pivotally connected, by pin means 8, within an upper tubular section 5 of lower portion 1. The axes of pin means 8 and 13 are in a common plane and intersect at an angle of 90 degrees. Pin means 13 may be provided by a single pin passing entirely through ring element 7 and upper portion end 12, or may be two separate pins which extend inwardly, from opposite sides, from the outside periphery of ring element 7, through ring element 7, and partially through upper portion end 12.

The gimbal connection 4 of the tool of the present invention advantageously allows the tool to be used at relatively large offset angles with respect to the work piece. The maximum offset angle attainable with a given embodiment depends upon, inter alia, the distance pin means 8 is located beneath the lip of tubular section 5, the shape of the lip of tubular section 5, and the thickness of end 12 where end 12 may engage the lip of tubular section 5. In the more preferred embodinemts, to maximize the offset angle attainable, ie., to those ranging up to and over 40 degrees, pin means 8 is located as closely to the lip of tubular section as is consistent with strength maintenance, the lip of tubular section is beveled at 6, as shown in FIG. 1, and end 12 is narrowed at 11, as shown in FIGS. 1 and 5.

The present invention includes any cross-sectional shape for end 12 of upper portion 10, and such shape suitable may be arcuate, as shown in FIGS. 5-7, or rectangular, as shown in FIG. 2. In the more preferred embodiments of the tool of the present invention, the cross-sectional shape of end 12 is rectangular, and the inside of ring element 7 is of substantially the same shape, such that when torque is applied to end 12 in the operation of the tool, the corners of end 12 at 15 may contact the inside periphery of ring element 7 and remove a portion of the shearing stresses imparted to pin means 13, thereby improving the durability of of the tool.

In the more preferred embodiments, additional efficiency of operation is imparted to the tool by rounding the corners of end 12 in the areas where end 12 may come in contact with the lip of tubular section 5, ie., rounding same at 14 as shown in FIG. 4.

In accordance with the present invention, lower portion 1 of the tool is provided with a work-piece contacting element, which suitably may be any tool element conventionally activated by rotational movement. Specific embodiments of such tool elements include a socket for nuts and bolts, ie., socket 2 as shown in FIGS. 1 and 2, a screw driver point 50, as shown in FIGS. 8 and 9, a drill bit, not shown, and the like. Lower portion also suitable may include intermediate extension rod elements and connection means, not shown, as upper portion was hereinabove described as having.

What is claimed is:

1. A jointed hand tool for use with rotatable, work-piece-contacting tool elements comprising an upper portion for rotatably driving said tool, a lower work-piece contacting portion including a tool element for contacting the work-piece, and a pin-mounted gimbal ring connection joining said upper drive portion and said lower work-piece contacting portion, said gimbal connection between said upper and lower portions being provided by said lower portion having at the top thereof an open-topped tubular section defining an outside ring element of said gimbal connection, and an inside ring element of said gimbal connection is attached to the lower end of said upper drive portion by pin means having an axis located in the same plane as and intersecting at an angle of 90 degrees the axis of the pin means of said gimbal connection connecting said outer and inner ring elements thereof, the lower end of said upper drive portion defining a rectangular periphery and said inner ring element of said gimbal connection having a rectangular opening in the interior thereof into which opening said lower end of said upper drive portion is received and attached by said pin means therefor, whereby, when rotation is imparted to said drive portion, the adjacent walls of said drive portion and said inner ring element abut each other and thereby reduce torque applied to said drive portion-inner ring connection pin means.

2. The jointed hand tool according to claim 1 wherein said upper drive portion includes handle means for grasping said tool to rotate said tool manually.

3. The jointed hand tool according to claim 1 wherein said upper drive portion includes connection means for operatively connecting a non-manual power source to said upper drive portion.

4. The jointed hand tool according to claim 1 wherein said at least one of said upper and lower portions thereof includes an extension rod element.

5. The jointed hand tool according to claim 1 wherein said tool element of said work-contacting portion is a socket for turning nuts.

6. The jointed hand tool according to claim 1 wherein said tool element of said work-contacting portion is a screw driver point.

7. The jointed hand tool according to claim 1 wherein said tool element of said work-contacting portion is detachable from said lower portion of said tool.

* * * * *